US011010392B1

(12) United States Patent
Hirsch et al.

(10) Patent No.: US 11,010,392 B1
(45) Date of Patent: May 18, 2021

(54) COLLABORATIVE INFORMATION RETRIEVAL ACROSS A NETWORK OF VARYING PERMISSIONS

(71) Applicant: Box, Inc., Redwood City, CA (US)

(72) Inventors: Jack Hirsch, San Francisco, CA (US);
Danial Jaffry, Los Angeles, CA (US);
Jordan Knox, Oakland, CA (US); Juan Carlos Perez, Oakland, CA (US);
Brandon Volbright, Portland, OR (US);
Adam Walz, Sandy, UT (US); Wentao Lu, San Francisco, CA (US); Akhil Verghese, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 232 days.

(21) Appl. No.: 15/866,719

(22) Filed: Jan. 10, 2018

Related U.S. Application Data

(60) Provisional application No. 62/449,463, filed on Jan. 23, 2017.

(51) Int. Cl.
*G06F 16/2457* (2019.01)
*G06F 21/62* (2013.01)
*G06F 16/248* (2019.01)
*G06F 16/2458* (2019.01)
*G06F 16/9535* (2019.01)

(52) U.S. Cl.
CPC ...... *G06F 16/24578* (2019.01); *G06F 16/248* (2019.01); *G06F 16/2471* (2019.01); *G06F 16/9535* (2019.01); *G06F 21/6218* (2013.01)

(58) Field of Classification Search
CPC .......... G06F 16/9535; G06F 16/24578; G06F 16/951; G06F 16/248; G06F 16/24565
See application file for complete search history.

(56) References Cited

U.S. PATENT DOCUMENTS

| 2013/0014023 | A1* | 1/2013 | Lee | G06Q 10/101 715/751 |
| 2013/0262420 | A1* | 10/2013 | Edelstein | G06F 40/197 707/695 |
| 2015/0066973 | A1* | 3/2015 | Kim | G06F 16/951 707/766 |

\* cited by examiner

*Primary Examiner* — Truong V Vo
(74) *Attorney, Agent, or Firm* — Sheridan Ross P.C.

(57) ABSTRACT

Searching data for a user includes searching a first set of data that is directly accessible to the user to provide a first set of search results, searching a second set of data that is not directly accessible to the user to provide a second set of search results, comparing the search results, and, if at least a portion of the second set of search results is better than the first set of search results, causing the portion to be provided to the user. Causing the portion to be provided to the user may include obtaining permission from an entity that controls permissions to the portion of the second set. The entity that controls permissions to the portion of the second set may be an owner of the portion. The first set of data may be determined based on credentials and sharing permissions of the user.

26 Claims, 4 Drawing Sheets

COLLABORATIVE INFORMATION RETRIEVAL ACROSS A NETWORK OF VARYING PERMISSIONS

CROSS-REFERENCE TO RELATED APPLICATIONS

This application claims priority to U.S. Prov. App. No. 62/449,463, filed on Jan. 23, 2017, and entitled "COLLABORATIVE INFORMATION RETRIEVAL ACROSS A NETWORK OF VARYING PERMISSIONS", which is incorporated herein by reference.

TECHNICAL FIELD

This application is directed to the field of information search, retrieval and collaboration, and more particularly to the field of information retrieval within a network of content owners with varying content access permissions.

BACKGROUND OF THE INVENTION

Efficient enterprise search has long become a key component of the workforce productivity. Thus, according to industry studies, typical information workers spend up to a quarter of their time searching for information, while 10% of knowledge workers spend more than twenty hours per week looking for information. Overall, 10% of salary costs are wasted searching for information. Another study by Aberdeen discovered strong correlations between an overall company performance and success indicators of corporate search. For example, at top performing companies, 67% of searches listed the most relevant results on the first page compared with 42% amongst others. Additionally, in top performing enterprises, executives saved on average six hours per week searching for information compared to only one hour per week that was saved by executives in companies outside of the top performing company list.

Unfortunately, enterprise search experiences for many employees still fall far below expectations. Thus, according to an IDC report, searchers are successful in finding the information they seek only 50% of the time or less. A MindMetre/Smartlogic survey has further quantified today's unsatisfactory enterprise search reality: 65% of survey participants define a good search experience as taking less than two minutes to find what they were looking for, while only 48% of participants have achieved that result during their searches; this indicates a 17% gap between the expectations and the reality. Additionally, 27% of participants have stated that their average search takes four minutes or more, which 90% of survey participants have defined as a poor search experience.

In most networked organizations, users are only provisioned with access to a subset of the organization's available private data. A user generally has access to three levels, or categories, of data, files and documents: (i) data that the user has uniquely created; (ii) data that have been explicitly shared with the user by others, such as by individual sharing, sharing for a project or other associated with teamwork, departmental sharing, etc.; and (iii) data shared with the whole organization, such as employee handbooks, public corporate policies, vacation policies and other organization-wide HR documents, etc.

Organizational access to data differs from other information retrieval situations in that inside organizations or networks of organizations, information is considered inherently private, as opposed to public repositories, such as the world-wide web, where the information is inherently public. Current mechanisms of information retrieval within a network are limited to a given user's scope of available information. That scope of information availability can range from private to public, but remains fixed through the information retrieval process.

Notwithstanding progress in search technologies that enable advanced retrieval of relevant information from datasets accessible by the user, challenges caused by the limited scope of information remain. In many cases, other members of the organization may possess more relevant information absent in the user's' immediate information access area, where the more relevant information is potentially shareable but not yet explicitly shared with the user. Analogously, more relevant information may exist within a network (for example, in a network of computers or in logical content units of a cloud service, such as project related accounts in a content management system) that is beyond availability for immediate user access. Therefore, user productivity and quality of work and decisions made by the user may depend upon access to additional search results that are present in the organization, but escape an immediately accessible data scope due to fixed data permissions structures.

Accordingly, it is desirable to provide a mechanism for efficient information retrieval across a networked organization that expand data access capabilities for users beyond fixed data permissions, while simultaneously maintaining consistency with an existing information security structure within the organization.

SUMMARY OF THE INVENTION

According to the system described herein, searching data for a user includes searching a first set of data that is directly accessible to the user to provide a first set of search results, searching a second set of data that is not directly accessible to the user to provide a second set of search results, comparing the first and second sets of search results, and, if at least a portion of the second set of search results is better than the first set of search results, causing the portion to be provided to the user. Causing the portion to be provided to the user may include obtaining permission from an entity that controls permissions to the portion of the second set. The entity that controls permissions to the portion of the second set may be an owner of the portion. The portion of the second set may be provided to the user only if system permissions allow sharing the portion with the user independent of any permission granted by the entity. Fragments of content units in some of the portion may be obfuscated before being provided to the user. The first set of data may be determined based on credentials and sharing permissions of the user. The portion of the second set of search results may be determined to be better than the first set of search results based on the portion being more recent than the first set of search results, the portion being more comprehensive than the first set of search results, the portion being developed by more trusted teams or authors than the first set of search results, and/or the portion being presented to higher executive levels than the first set of search results. The second data set may include a full content repository of an organization of the user, data for other users in a network of users having a working relationship with the user, an ad hoc network of experts in a knowledge domain based on one or more prior requests of the user or/and based on retrieved results in the domain, and/or file repositories in workplace social networks. The workplace social networks include Slack, Yammer, and/or enterprise and employee clusters in a cloud storage service. The cloud storage service may be Dropbox, Box, Amazon S3, Google Drive, or Microsoft Azure. At least some of the first and second sets of data may be provided in a cloud storage system. The first set of data may be logically separated from the second set of data using ownership and permissions of the data. The user may be a client of the cloud storage system.

According further to the system described herein, a non-transitory computer readable medium contains software that searches data for a user. The software includes executable code that searches a first set of data that is directly accessible to the user to provide a first set of search results, executable code that searches a second set of data that is not directly accessible to the user to provide a second set of search results, executable code that compares the first and second sets of search results, and executable code that causes the portion to be provided to the user if at least a portion of the second set of search results is better than the first set of search results. Executable code that causes the portion to be provided to the user may include executable code that obtains permission from an entity that controls permissions to the portion of the second set. The entity that controls permissions to the portion of the second set may be an owner of the portion. The portion of the second set may be provided to the user only if system permissions allow sharing the portion with the user independent of any permission granted by the entity. Fragments of content units in some of the portion may be obfuscated before being provided to the user. The first set of data may be determined based on credentials and sharing permissions of the user. The portion of the second set of search results may be determined to be better than the first set of search results based on the portion being more recent than the first set of search results, the portion being more comprehensive than the first set of search results, the portion being developed by more trusted teams or authors than the first set of search results, and/or the portion being presented to higher executive levels than the first set of search results. The second data set may include a full content repository of an organization of the user, data for other users in a network of users having a working relationship with the user, an ad hoc network of experts in a knowledge domain based on one or more prior requests of the user or/and based on retrieved results in the domain, and/or file repositories in workplace social networks. The workplace social networks include Slack, Yammer, and/or enterprise and employee clusters in a cloud storage service. The cloud storage service may be Dropbox, Box, Amazon S3, Google Drive, or Microsoft Azure. At least some of the first and second sets of data may be provided in a cloud storage system. The first set of data may be logically separated from the second set of data using ownership and permissions of the data. The user may be a client of the cloud storage system. The software may be pre-loaded in a mobile device, installed from an app store, or downloaded from a Web site. The mobile device may use a particular operating system such as iOS, Android OS, Windows Phone OS, Blackberry OS or mobile versions of Linux OS.

The proposed system expands a search query of a user beyond what is immediately accessible to a portion of network information of the user that is determined by user access permissions; then the system identifies additional search results that may be more relevant than results from an immediately accessible information area of the user, solicits sharing permissions from owners of additional search results, clears user access to additional search results by checking regular permissions of the user and possibly modifying the search results to show only permissible information, and provides permitted additional search results to the user, along with basic search results within the accessible information area of the user.

In other words, the system addresses a need for information retrieval in situations where the requested information may not be immediately accessible by the requestor but may be accessible by different member(s) or groups (with whom the requestor may or may not have direct or indirect work relations), subject to (i) permission by the information holder to release the more relevant information to the requestor; and (b) to consistency of that permission with the overall security structure within an organization and specifically with a position of the requestor within that structure.

The process of providing the user with an expanded set of search results and other requested information, such as answers to questions by the user, may include at least some of the following:

1. The user enters an information request, such as a search query or a question to an automatic answering service.
2. The system, such as a network service with a cloud component, for example, the Butter.ai™ system, identifies the scope of information accessible by the user, subject to existing user permissions, sharing arrangements and organizational policies, and searches for relevant information within the identified scope.
3. The system discovers additional relevant information by expanding the scope of accessible information. Options for the expanded search area may include, without limitation:
   a. Searching for results within the full content repository of the organization;
   b. Expanding a search to information accessible by each user within a network of users who currently have or who have had in the past work relations with the user;
   c. Creating an ad hoc network of experts in the knowledge domain identified from the original user request or/and from the retrieved results in the accessible domain.
   d. The expanded search area may include file repositories in workplace social networks, such as Slack, Yammer, as well as enterprise and employee clusters in cloud storage services, including Dropbox, Box, Amazon S3, Google Drive, Microsoft Azure, etc.
4. Depending on the expanded scope, an additional search may be conducted either concurrently with the original search (for example, when the expanded search scope is known from the beginning) or sequentially (for instance, when the original search results are used to define the expanded scope, as in option 3c above).
5. The system compares additional and original relevant information and determines whether the additional information includes more valuable results the user may benefit from. Criteria for comparing different information units may include, but are not limited to, timing (more recent documents may have higher priority), creation history, authors, document publishing specifics (for example, documents published for an executive team may generally be considered having higher quality than interim documents or drafts for such executive release), document authoring teams, etc.
6. If the system finds additional information that (i) has higher value/quality than analogs of information retrieved from the original user request and from the limited data scope or (ii) is absent and does not have analogs in the information retrieved from the original search, then the system may identify the person(s) or a mechanism to request permission to release such information to the requesting user. In some scenarios, the system may have to request permission directly from original authors or latest contributors to the relevant content; in other situations, documents may include material from many contributors with different security permissions and the system may have to identify a person, committee or policy under which the content may be shared with the user. Under each scenario, the systems may request or check permission to share the document according to the rules pertinent to that scenario. If a sharing request is declined, the requesting user may or may not be informed about the decision. If consent is granted, then the system performs the steps 7, 8.

7. The system may check whether it is necessary/useful to supplement an already granted permission (from an authorized person, a content owner or other mechanism) to share a unit of additional content with the user. The system may also check a permission history of an authorized person and whether the content unit has already been successfully shared in the past by such additional permissions. There may be several scenarios and outcomes for such additional checks:
   a. The owner has complete authority over a unit of additional content and the content may be offered to the user immediately upon receiving sharing consent from the owner.
   b. The owner, authorized person or other permission mechanism has conditional authority over a content unit and the content unit must undergo additional clearance in order to be offered to the requestor/user.
   c. A particular case of scenario 7b may include a partial delivery of content to the requestor due to obfuscating portions of the content and retaining only portions relevant to the information request of the user. Such obfuscation may be done, for example, by contextually comparing the additional content with similar content in the originally retrieved information within the access area of the user.
8. The user may be notified that additional information of higher quality is available either after the additional information has received proper sharing permissions and passed all clearance procedures (when applicable), or during receipt of results given from an original limited data scope. If the user wishes to receive the additional information, the additional information is immediately provided.

In some scenarios, the user may be notified about relevant additional information, access to which has been declined, with potential explanations about additional clearances the user must acquire and/or organization members the user has to contact to obtain access permissions.

The system described herein allows for assembling for search of a variety of disparate sources; and, overriding an existing permission/credentials system to try to identify best answers to search query within a whole corpus of compiled information. If additional data is located, the system asks data owners or other authorized individuals for permission to release the additional data to the requestor and, depending on the answer, the system may reject, provide or partially obfuscate the additional data, as well as possibly obtain additional information from the requestor as a condition of release of the additional data.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for expanding enterprise search, question answering and other information services beyond information areas immediately available to each user, identifying relevant additional information of higher quality than would be immediately accessible by the user, clearing access to the additional information by requesting permissions for information sharing from information owners and by other mechanisms and providing the user with access to the additional information, on par with original results available to the user from information areas immediately available to the user.

Figure 1:
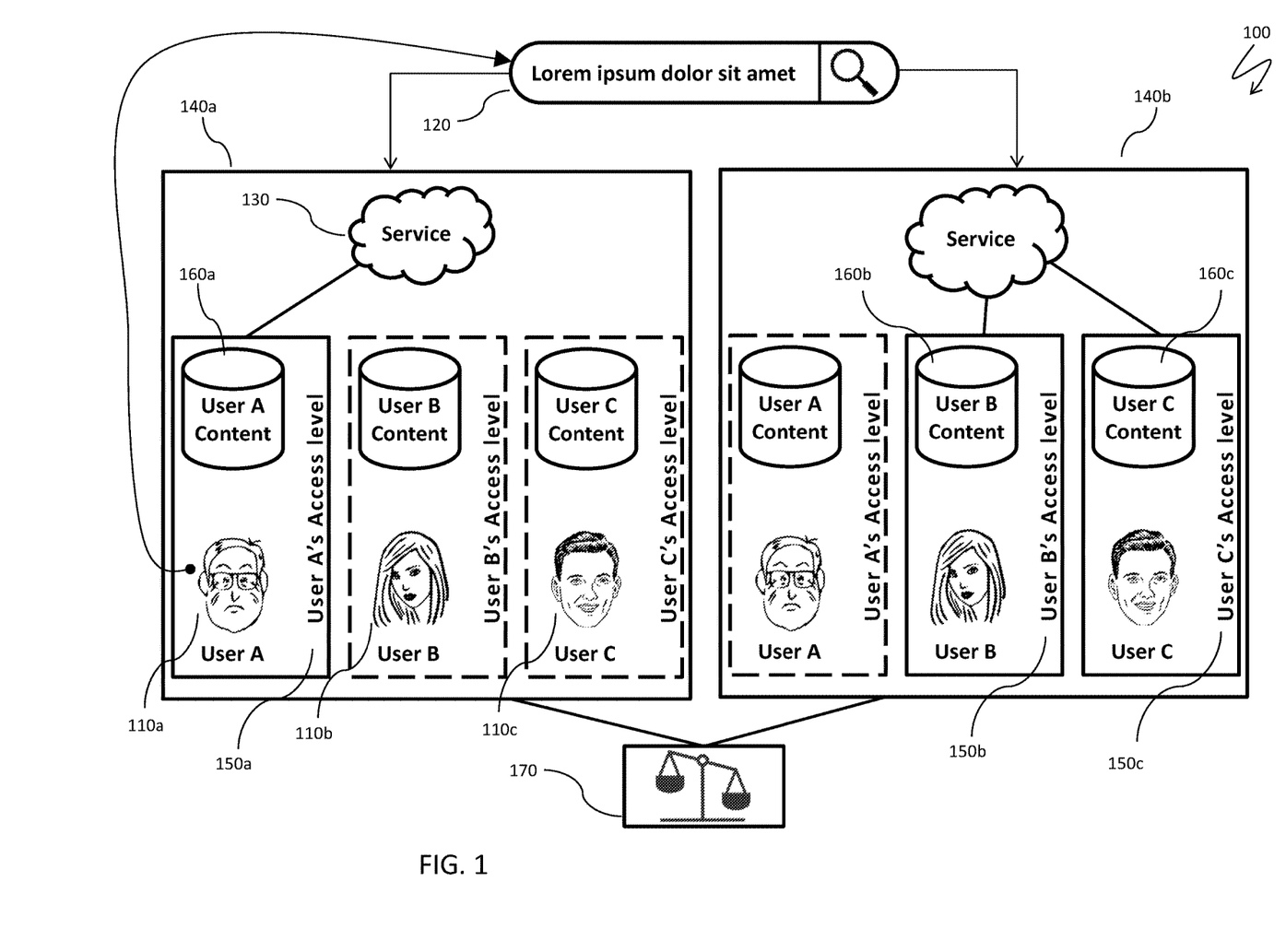
FIG. 1 is a schematic illustration of a service-centric view of an information discovery chart, according to an embodiment of the system described herein.

FIG. 1 is a schematic illustration 100 of a service-centric view of an information discovery chart. A user 110a (User A) places an information request 120 to the system, which may be a search term, a question, etc. The system, represented in FIG. 2 by a cloud service 130, may sequentially conduct two searches 140a, 140b.

The search 140a processes information only from an access level 150a of the user 110a where content 160a (set of data) is directly available to the user 110a based on current credentials and sharing permissions of the user. Dashed lines around access levels and content storage of two additional users 110b (User B) and 110c (User C) indicate that the additional content potentially available from those the additional users 110b, 110c is not accessed in the first search 140a.

In contrast, the search 140b uncovers additional relevant information based on the request 120 by searching only content 160b (set of data) of user B, and content 160c (set of data) of user C from access levels 150b, 150c of the users 110b, 110c, respectively, while ignoring information that is directly available to the user 110a (i.e., ignoring the content 160a).

In an embodiment herein, the content 160a is data locally stored on a desktop computer of the user 110a while the content 160b is data locally stored on a desktop computer of the user 110b and the content 160c is data locally stored on a desktop computer of the user 110c. In other embodiments, at least some of the contents 160a-160c is stored on a central repository (e.g., a server, cloud storage, etc.), but is selectively accessible to users that access the central repository.

For example, the content 160b may be provided on a cloud storage system that is also generally accessed by the user 110a, but the content 160b is not directly accessible (i.e., readable) by the user 110a when the user 110a accesses the cloud storage system.

After both of the searches 140a, 140b are completed, results are sent into an assessment subsystem 170 where it is determined whether some of the additionally discovered relevant results for the original request 120 obtained in the search 140b are more valuable (for example, more recent, more comprehensive, developed by more trusted teams or authors, presented to higher executive levels, etc.) than results obtained from the search 140a.

Figure 2:
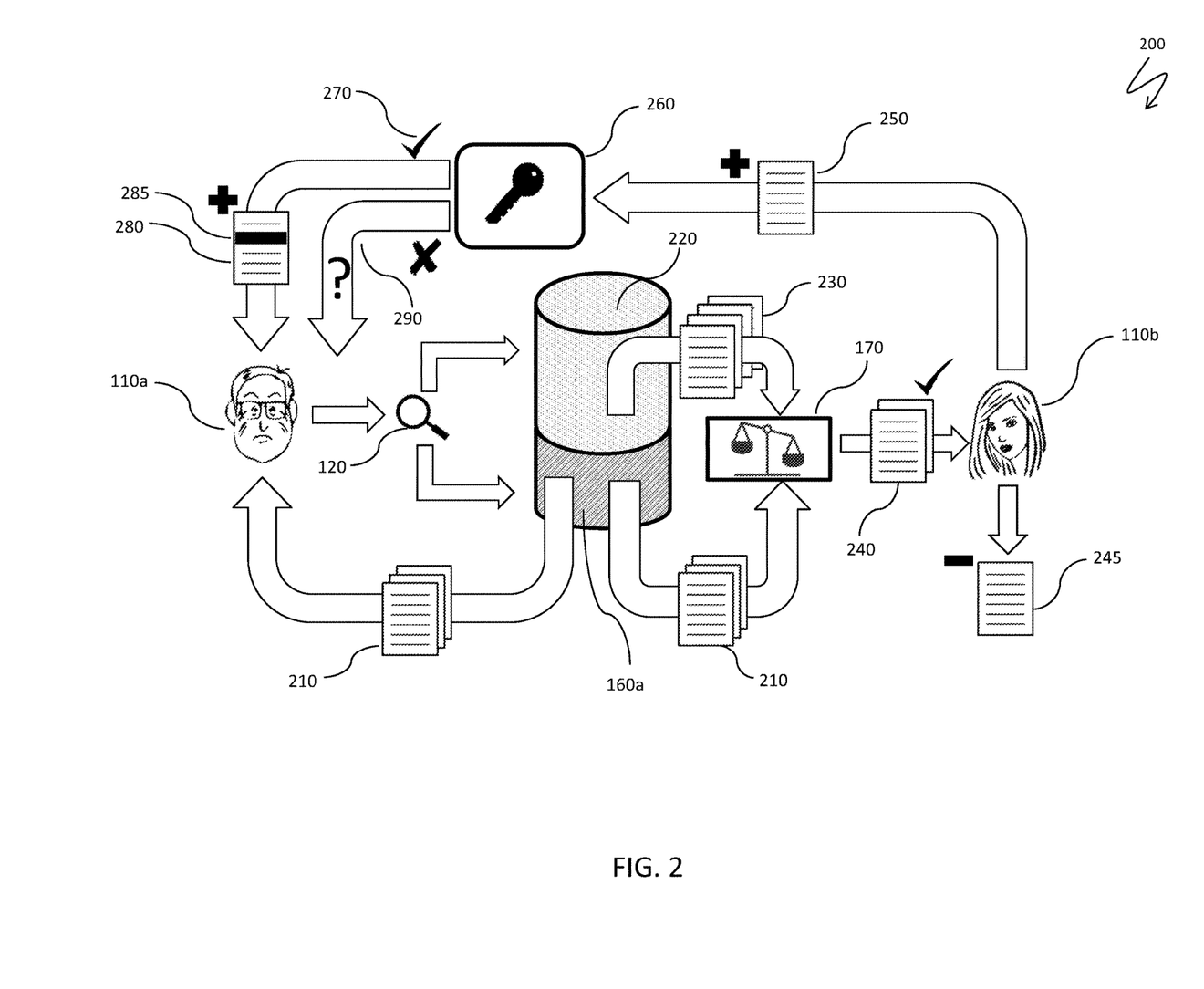
FIG. 2 is a schematic illustration of interaction flow between a requesting user, an information delivery service and a content owner, according to an embodiment of the system described herein.

FIG. 2 is a schematic illustration 200 of an interaction flow between a requesting user, an information delivery service and a content owner. Consistent with the information discovery chart in FIG. 1, the user 110a places the information request 120 with the system.

Subsequently, the system conducts two phases of information processing:
1. A first phase processes the information request 120 within the access level of the user/requester (i.e., the content storage 160a), which results in the set of documents and other information units (materials) 210.
2. The second phase processes the information request 120 within an expanded scope 220, accessible by other users, as explained elsewhere herein; the second phase results in another set 230 of relevant documents (materials) satisfying the conditions of the information request 120.

Both sets of resulting materials 210, 230 are entered into the assessment subsystem 170 (also shown in FIG. 1) which identifies processing results within the second set 230 that have higher quality and/or relevance than results from the set 210. If superior results in a set 240 have been found, the set 240 is presented to an entity that controls permissions thereof, such as an owner or an authorized person (e.g., the user 110b, which may also be a committee or permission mechanism, as explained elsewhere herein) with a permission request to share the results from the set 240 with the user 110a. The authorized person (e.g., the user 110b) may deny sharing portions 245 of the set 240 with the requestor 110a, as illustrated by a minus sign, and allow sharing other portions 250 (marked with the plus sign) with the user 110a.

However, permission of an authorized person to share some additional materials with a requestor does not necessarily mean that the additional materials are shared immediately and unconditionally. Some organizations may have stricter information access permission policies that would require additional checking and clearance before information is shared. This is illustrated by a permissions subsystem 260, which may clear for delivery only a portion of additional materials 250, as indicated by a check mark 270. Resulting cleared materials 280 may be instantly delivered to the user 110a; in some cases, portions 285 of the delivered materials may be obfuscated, as explained elsewhere herein. A remainder 290 of the additional materials 250 are approved for sharing by the user 110b but fail to unconditionally clear the permission subsystem 260. In some instances, additional conditions and checks may be used to allow the remainder 290 to be delivered to the user 110a. The set 210 from the content 160a may also be delivered to the user 110a, as illustrated by a left bound arrow from the content 160a.

Figure 3:
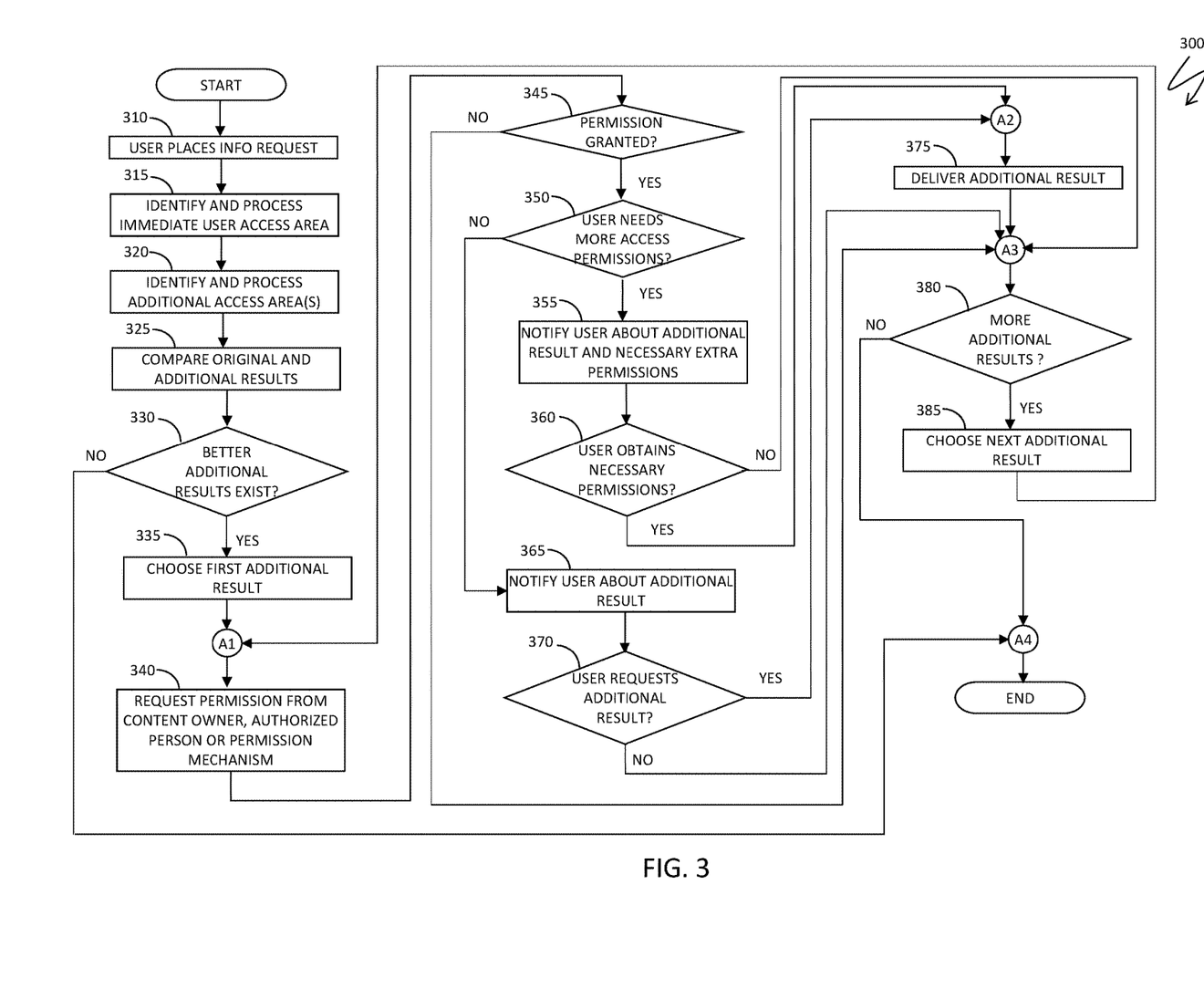
FIG. 3 is a system flow diagram illustrating system functioning, according to an embodiment of the system described herein.

Referring to FIG. 3, a system flow diagram 300 illustrates processing in connection with identifying, clearing and providing to a requestor expanded search results. Processing begins at a step 310, where a user places an information request with the system. After the step 310, processing proceeds to a step 315, where the system identifies an immediate user access area and processes (searches) information from that area (see, for example, the step 140a in FIG. 1).

After the step 315, processing proceeds to a step 320, where the system identifies and processes information from additional access area(s), as explained elsewhere herein. After the step 320, processing proceeds to a step 325, where the system compares initial processing results from the step 315 and additional processing results from the step 320, as explained elsewhere herein (see, for example, the assessment subsystem 170 in FIGS. 1, 2).

After the step 325, processing proceeds to a test step 330, where it is determined whether a set of more valuable (better) additional results produced at the step 325 is non-empty. If so, processing proceeds to a step 335, where the system chooses a first portion of the valuable additional result; otherwise, processing is complete. After the step 335, processing proceeds to a step 340, where the system requests permission from a content owner, authorized person(s) or other permission mechanism to share the result with the user (requestor). After the step 340, processing proceeds to a test step 345, where it is determined whether the permission has been granted. If so, processing proceeds to a test step 350, where it is determined whether the user needs more access permissions (see, for example, the permission subsystem 260 in FIG. 2). If it is determined at the test step 350 that the user needs additional permissions, processing proceeds to a step 355, where the user is notified about an additional result and a necessity to obtain extra permissions. After the step 355, processing proceeds to a test step 360, where it is determined whether the necessary additional permission have been obtained. If so, processing proceeds to a step 375 where the additional result has been delivered; otherwise, processing proceeds to a test step 380, which can be independently reached from the test step 350 if it is determined at the test step 350 that the user does not need additional permissions.

If it is determined at the test step 350 that the user does not need additional access permissions, processing proceeds to a step 365, where the user is notified about the additional results. After the step 365, processing proceeds to a test step 370, where it is determined whether the user requests the additional results. If so, processing proceeds to the step 375, which can be independently reached from the test step 360, as described above; otherwise, processing proceeds to the test step 380, described above, where it is determined whether there are additional results available. If so, processing proceeds to a step 385, where the system chooses the next additional result. After the step 385, processing proceeds back to the step 340, which can be independently reached from the step 335. (Note that the test step 380 can be independently reached from the step 375 and the test steps 350, 360, as described above.) If it is determined at the test step 380 that there are no more additional results, processing is complete.

Figure 4:
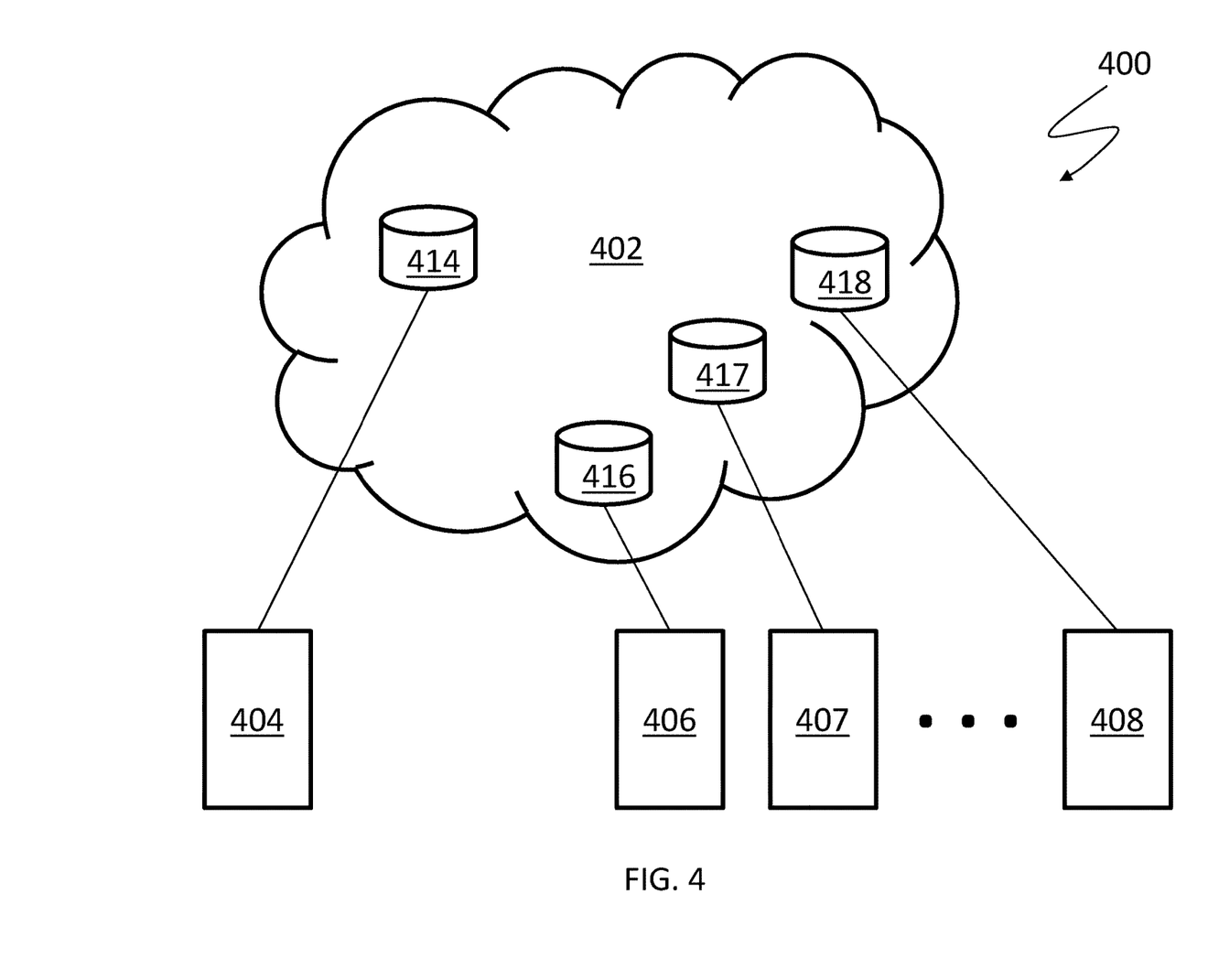
FIG. 4 is a schematic illustration of a cloud service and a plurality of connected clients that provide information discovery according to an embodiment of the system described herein.

Referring to FIG. 4, a schematic diagram 400 shows a cloud service 402 in communication with a first client 404 and a plurality of additional clients 406-408. The first client 404 accesses a first set of data 414 in the cloud service 402 while each of the additional clients 406-408 access one of a plurality of different sets of data 416-418. The clients 414, 416-418 may be desktop or laptop computers, smartphone devices, tablet devices, etc. The cloud service 402 may provide the functionality described herein. Note that the sets of data 414, 416-418 may be physically comingled, but logically separated by the cloud service 402 using permissions/ownership so that, for example, the set of data 414 is owned by and accessible by the client 404 but not directly accessible by the clients 406-408 while the set of data 416 is owned by and accessible by the client 406 but not directly accessible by the clients 404, 407, 408. Each of the clients 404, 406-408 is similar to the users 110*a*-110*c* described elsewhere herein and the data sets 414, 416-418 are similar to the contents 160*a*-160*c* described elsewhere herein.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, storage configurations and access permission mechanisms may vary from the illustrations presented herein. Further, various aspects of the system described herein may be implemented using software, hardware, a combination of software and hardware and/or other computer-implemented modules or devices having the described features and performing the described functions. Smartphones functioning as devices for placing inquiries and obtaining additional results may include software that is pre-loaded with the device, installed from an app store, installed from a desktop (after possibly being pre-loaded thereon), installed from media such as a CD, DVD, etc., and/or downloaded from a Web site. Such smartphones may use operating system(s) selected from the group consisting of: iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of searching data for a user, comprising:
searching, by a server of a cloud service, a first set of data that is directly accessible to the user to provide a first set of search results, wherein the first set of data is determined to be directly accessible to the user based on user access permissions for data in the first set of data;
searching, by the server of the cloud service, a second set of data that is not directly accessible to the user to provide a second set of search results, wherein the second set of data is determined to be not directly accessible to the user based on user access permissions for data in the second set of data;
comparing, by the server of the cloud service, a plurality of criteria for each result in the first sets of search results to the plurality of criteria for each result in the second set of search results;
determining, by the server of the cloud service, a value for each result in the first set of search results and each result in the second set of search results based on the comparing; and
in response to at least one result of the second set of search results having a higher determined value than at least one result the first set of search results, causing, by the server of the cloud service the at least one result of the second set of search results to be provided to a client device of the user.

2. A method, according to claim 1, wherein causing the at least one result of the second set of search results to be provided to the client device of the user includes obtaining permission from an entity that controls permissions to the at least one result of the second set of data.

3. A method, according to claim 2, wherein the entity that controls permissions to the second set of data is an owner of the second set of data.

4. A method, according to claim 2, wherein the at least one result of the second set of search results is provided to the client device of the user only if system permissions allow sharing the second set of data with the user independent of any permission granted by the entity.

5. A method, according to claim 1, wherein fragments of content units in some of the at least one result of the second set of search results are obfuscated before being provided to the client device of the user.

6. A method, according to claim 1, wherein the first set of data is determined based on credentials and sharing permissions of the user.

7. A method, according to claim 1, wherein the second data set includes at least one of: a full content repository of an organization of the user, data for other users in a network of users having a working relationship with the user, an ad hoc network of experts in a knowledge domain based on one or more prior requests of the user or/and based on retrieved results in the domain, or file repositories in workplace social networks.

8. A method, according to claim 7, wherein the workplace social networks include at least one of: Slack, Yammer, or enterprise and employee clusters in the cloud storage service.

9. A method, according to claim 8, wherein the cloud storage service is one of: Dropbox, Box, Amazon S3, Google Drive, and Microsoft Azure.

10. A method, according to claim 1, wherein at least some of the first and second sets of data are provided in a cloud storage system.

11. A method, according to claim 10, wherein the first set of data is logically separated from the second set of data using ownership and permissions of the data.

12. A method, according to claim 10, wherein the user is a client of the cloud storage system.

13. A non-transitory computer readable medium comprising a set of instructions stored therein which, when executed by a processor, causes the processor to search data for a user by:
searching a first set of data that is directly accessible to the user to provide a first set of search results, wherein the first set of data is determined to be directly accessible to the user based on user access permissions for data in the first set of data;

searching a second set of data that is not directly accessible to the user to provide a second set of search results, wherein the second set of data is determined to be not directly accessible to the user based on user access permissions for data in the second set of data;

comparing a plurality of criteria for each result in the first sets of search results to the plurality of criteria for each result in the second set of search results;

determining a value for each result in the first set of search results and each result in the second set of search results based on the comparing; and in response to at least one result of the second set of search results having a higher determined value than at least one result the first set of search results, causing the at least one result of the second set of search results to be provided to a client device of the user.

14. A non-transitory computer readable medium, according to claim 13, wherein causing the at least one result of the second set of search results to be provided to the client device of the user includes obtaining permission from an entity that controls permissions to the at least one result of the second set of data.

15. A non-transitory computer readable medium, according to claim 14, wherein the entity that controls permissions to the second set of data is an owner of the second set of data.

16. A non-transitory computer readable medium, according to claim 14, wherein the at least one result of the second set of search results is provided to the client device of the user only if system permissions allow sharing the second set of data with the user independent of any permission granted by the entity.

17. A non-transitory computer readable medium, according to claim 13, wherein fragments of content units in some of the at least one result of the second set of search results are obfuscated before being provided to the client device of the user.

18. A non-transitory computer readable medium, according to claim 13, wherein the first set of data is determined based on credentials and sharing permissions of the user.

19. A non-transitory computer readable medium, according to claim 13, wherein the second data set includes at least one of: a full content repository of an organization of the user, data for other users in a network of users having a working relationship with the user, an ad hoc network of experts in a knowledge domain based on one or more prior requests of the user or/and based on retrieved results in the domain, or file repositories in workplace social networks.

20. A non-transitory computer readable medium, according to claim 19, wherein the workplace social networks include at least one of: Slack, Yammer, or enterprise and employee clusters in a cloud storage service.

21. A non-transitory computer readable medium, according to claim 20, wherein the cloud storage service is one of: Dropbox, Box, Amazon S3, Google Drive, and Microsoft Azure.

22. A non-transitory computer readable medium, according to claim 13, wherein at least some of the first and second sets of data are provided in a cloud storage system.

23. A non-transitory computer readable medium, according to claim 22, wherein the first set of data is logically separated from the second set of data using ownership and permissions of the data.

24. A non-transitory computer readable medium, according to claim 22, wherein the user is a client of the cloud storage system.

25. A non-transitory computer readable medium, according to claim 13, wherein the software is one of: pre-loaded in a mobile device, installed from an app store, and downloaded from a Web site.

26. A non-transitory computer readable medium, according to claim 25, wherein the mobile device uses an operating system selected from the group consisting of: iOS, Android OS, Windows Phone OS, Blackberry OS and mobile versions of Linux OS.

* * * * *